United States Patent [19]

Hirs

[11] 3,780,861

[45] Dec. 25, 1973

[54] GRANULAR FILTER MEDIUM

[75] Inventor: Gene Hirs, Detroit, Mich.

[73] Assignee: Hydromation Filter Company, Livonia, Mich.

[22] Filed: Jan. 19, 1972

[21] Appl. No.: 219,145

[52] U.S. Cl. ................................ 210/80, 210/500
[51] Int. Cl. ........................................ B01d 23/24
[58] Field of Search .................... 210/40, 67, 500, 210/508, 80

[56] References Cited
UNITED STATES PATENTS

| | | | |
|---|---|---|---|
| 3,680,699 | 8/1972 | MacPherson | 210/503 X |
| 3,562,153 | 2/1971 | Tully et al. | 210/40 X |
| 3,550,774 | 12/1970 | Hirs et al. | 210/67 |

*Primary Examiner*—Samih N. Zaharna
*Assistant Examiner*—Robert H. Spitzer
*Attorney*—Hiram P. Settle, Jr.

[57] ABSTRACT

A method for filtering contaminants from suspension in liquids by utilizing, as a filter medium, granulated shells of black walnut (Juglans nigra L.).

1 Claim, No Drawings

GRANULAR FILTER MEDIUM

BACKGROUND OF THE INVENTION

Applicant has earlier proposed in his U.S. Pat. Nos. 3,557,955 and 3,550,774 a new and novel type of "deep bed" filter wherein synthetic polymeric materials in finely granulated form are utilized as the filter media.

The utilization of synthetic polymeric materials, such as polyvinyl chloride materials, is preferred because of the combination of the necessary physical characteristics of such materials. For example, the method and apparatus disclosed in U.S. Pat. No. 3,550,774 cleanses the filter medium by placing the mixture of medium and earlier removed contaminants in a slurry and then subjecting this slurry to a violent washing action, i.e., flowing the slurry past a perforate scrubbing element. Any practical filter medium for utilization in such a method must be light (preferably having a specific gravity of 1.55 or less), strong (having a modulus of elasticity of 40,000 psi or greater) and non-abrasive (so as not to wear away the perforate scrubbing element).

These requirements of the filter medium eliminate from consideration the common granular filter media, such as sand, anthracite, and activated carbon. Many other materials, particularly synthetic polymeric materials, are eliminated because of their high cost.

Many natural materials have been investigated and found wanting because of their inherent lack of the strength necessary to withstand the slurrying and violent cleansing of the media.

BRIEF DESCRIPTION OF THE INVENTION

It has been found that the granular shells of black walnut (Juglans nigra L.) possess a unique combination of properties which makes it fully acceptable as a filter medium for utilization in the method and apparatus disclosed in applicant's prior U.S. Pat. Nos. 3,550,774 and 3,557,955 or in similar apparatus or methods where a light, strong, and not too abrasive or brittle filter medium is necessary.

OBJECTS

It is, therefore, an important object of the present invention to provide a filter medium consisting essentially of a bed of granulated shells of black walnuts.

Another important object of the present invention is the provision of a method of filtering contaminant particles from a liquid by passing the contaminated liquid through a bed of granulated shells of black walnuts.

Yet another, and no less important, object of the present invention is the method of filtering contaminant particles from a liquid by passing the liquid through a bed of granulated shells of black walnuts, and cleansing the contaminant particles from the bed by violently slurrying the bed and the particles and passing the slurry past a perforate separating element through which a part of the slurry containing contaminant particles is withdrawn.

DETAILED DESCRIPTION OF THE INVENTION

As above explained, the present invention proposes a filter medium for utilization in the apparatus and methods set forth in applicant's earlier U.S. Pat. Nos. 3,550,774 and 3,557,955, and the disclosures of the apparatus and methods set forth in these two prior patents are included herein by reference. To utilize the filter bed of the present invention, granulated shells of black walnut (Juglans nigra L.) are simply substituted for the synthetic polymeric materials disclosed in said earlier patents. The apparatus remains the same as disclosed in said patents and the methods of operation remain the same.

The unique properties of the granulated shells of black walnut allow this complete substitution, and the shells are preferably utilized in a size ranging from about 20 to 60 US sieve number. The shells of black walnuts are light in weight, with a specific gravity of 1.3 to 1.4. The shells also are relatively strong, having a modulus of elasticity of 170,000 psi, and the shells are relatively non-abrasive when compared to sand or anthracite. This last property is somewhat suprising in view of the common use of walnut shells as a blasting grit for metal finishing. However, black walnut shells are utilized as "soft grit" which does not cause pitting of the metal part to be cleaned.

To illustrate the utilization of granular black walnut shells as a filter medium, the following table is presented. In obtaining the figures in this table, liquid containing a standard test dirt consisting of $Fe_3O_4$ dirt in the indicated amount was passed through 12 inches of 20 to 50 mesh granular black walnut shells. The dirt was added at a rate of 250 mg per liter. The filter flow rate was 10 gallons per minute per square foot of cross-sectional area of the shells. The following results were obtained:

| Gallons of filtered liquid | Pounds of dirt added per cubic foot of media | Filter effluent clarity mg/l |
|---|---|---|
| 20 | 0.5 | 0.24 |
| 40 | 1.0 | 0.36 |
| 60 | 1.5 | 3.2 |
| 80 | 2.0 | 9.9 |
| 100 | 2.5 | 14.5 |

Generally speaking, the above table illustrates that granular black walnut shells have a dirt holding capacity which is substantially equivalent to that of silica sand.

Other favorable characteristics of black walnut shells when utilized as a filter medium are that they are oil and water resistant, they have a hardness in Moh's of 3, and are for all practical purposes chemically inert. Also, granular black walnut shells are commerically available in all practical mesh sizes for use in deep bed filtration at a cost which is about one-sixth the cost of many inexpensive plastic materials.

I claim:

1. The method of filtering particulate contaminants from a liquid comprising;

flowing the contaminated liquid through a filter bed of granulated shells of black walnuts (Juglans nigra L.); terminating the flow of the contaminated liquid after at least a portion of the contaminants have been retained in said filter bed; and cleansing said filter bed by violently and turbulently backwashing at least a part of said filter bed having contaminants therein over a perforated element, and withdrawing at least a portion of said contaminants through said perforate element.

* * * * *